Feb. 4, 1958    J. R. LITTY    2,821,958
CAKE ICING MACHINE
Filed Aug. 16, 1955    4 Sheets-Sheet 2

INVENTOR.
JOHN R. LITTY
BY
ATTORNEYS

Feb. 4, 1958 J. R. LITTY 2,821,958
CAKE ICING MACHINE
Filed Aug. 16, 1955 4 Sheets-Sheet 3

INVENTOR.
JOHN R. LITTY
BY
Busser, Smith & Harding
ATTORNEYS

Feb. 4, 1958    J. R. LITTY    2,821,958
CAKE ICING MACHINE
Filed Aug. 16, 1955    4 Sheets-Sheet 4

INVENTOR.
JOHN R. LITTY
BY
ATTORNEYS

United States Patent Office 2,821,958
Patented Feb. 4, 1958

2,821,958

CAKE ICING MACHINE

John R. Litty, Goshen, N. J.

Application August 16, 1955, Serial No. 528,587

7 Claims. (Cl. 118—25)

This invention relates to a machine for the depositing of materials into various sizes and shapes of containers and for automatically decorating pies, cakes, and other objects.

It is the general object of the present invention to provide a machine for the depositing of materials into containers such as pie pans, cake pans, etc. or for the application of icings and toppings on cakes, pies, etc. in a decorative pattern or in such a fashion that it may be spread by hand to produce the desired results and has replacement elements so that the form or decoration may be readily changed and produced in any desired pattern, design or lettering required.

The invention is particularly applicable to the depositing of icing on cakes though the broader uses are as indicated above. For consistency, the description will be primarily directed to icing.

In accordance with the invention there is automatically measured a quantity of icing suitable for the results desired. A piston and cylinder arrangement associated with valve means controls the feed of icing.

In particular the machine is designed for the rapid icing of successive cakes, the parts being driven at such speed that an operator receiving cakes on a conveyor may place them in position to be iced, and when the icing is completed may remove them to effect very rapidly the icing of successive cakes.

The foregoing and other objects of the invention, particularly relating to details of construction and operation will become apparent from the following description read in conjunction with the accompanying drawings, in which.

Figure 1:
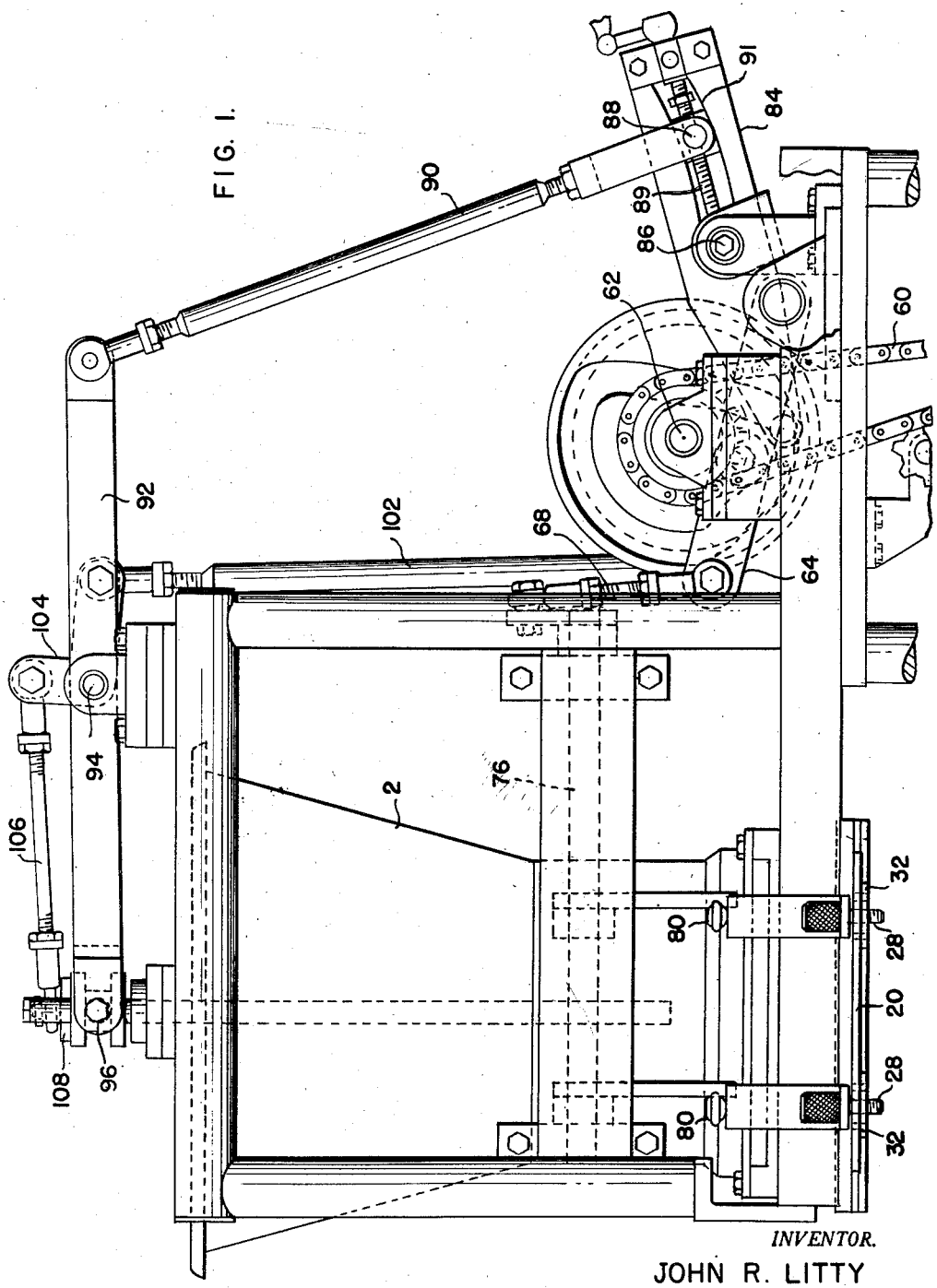
Figure 1 is a side elevation of the upper portion of the machine.
Figures 2, 6:
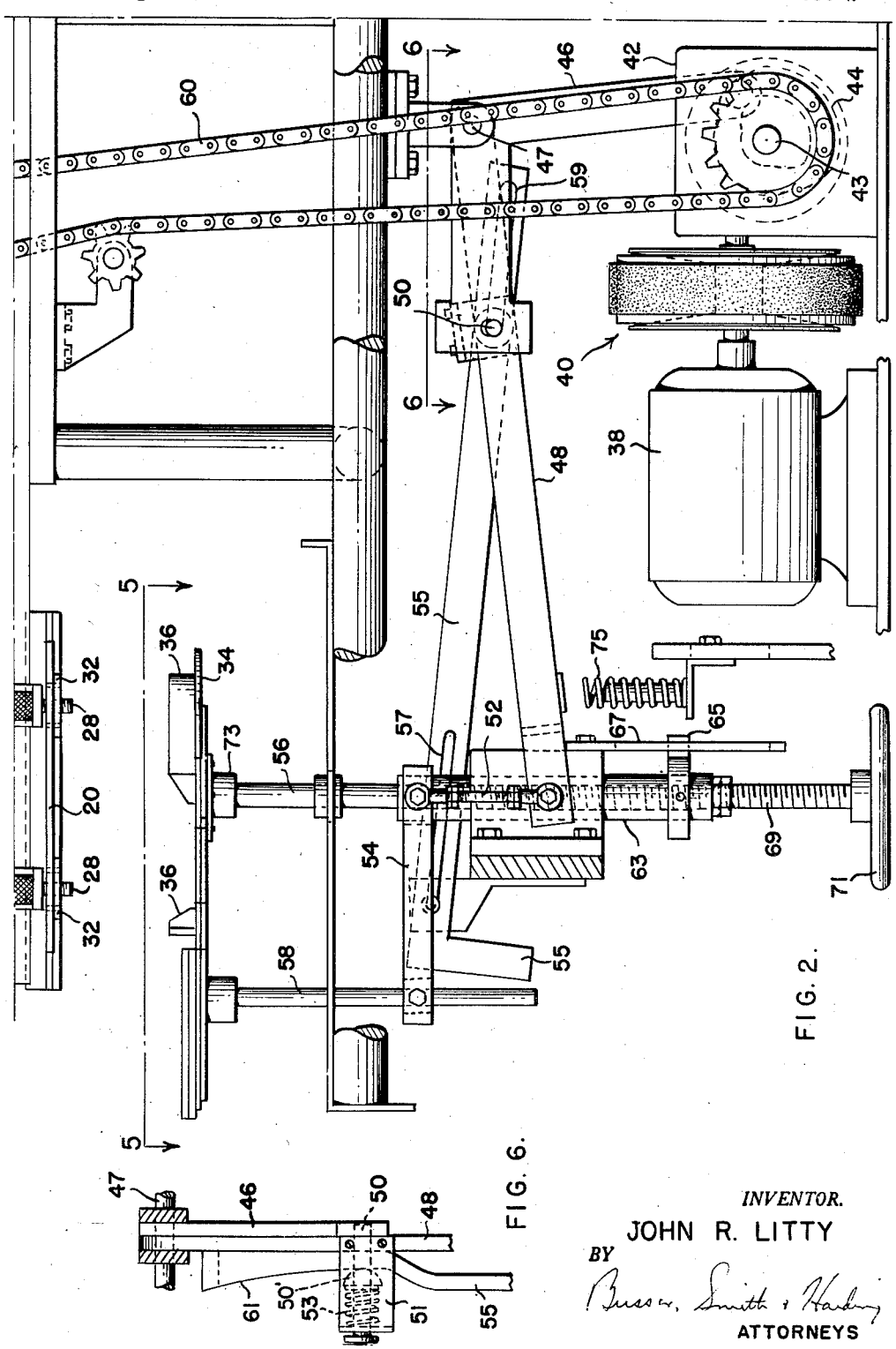
Figure 2 is a side elevation of the lower portion thereof.
Figure 6 is a fragmentary sectional view looking downwardly from the plane indicated at 6—6 in Figure 2.
Figure 3:
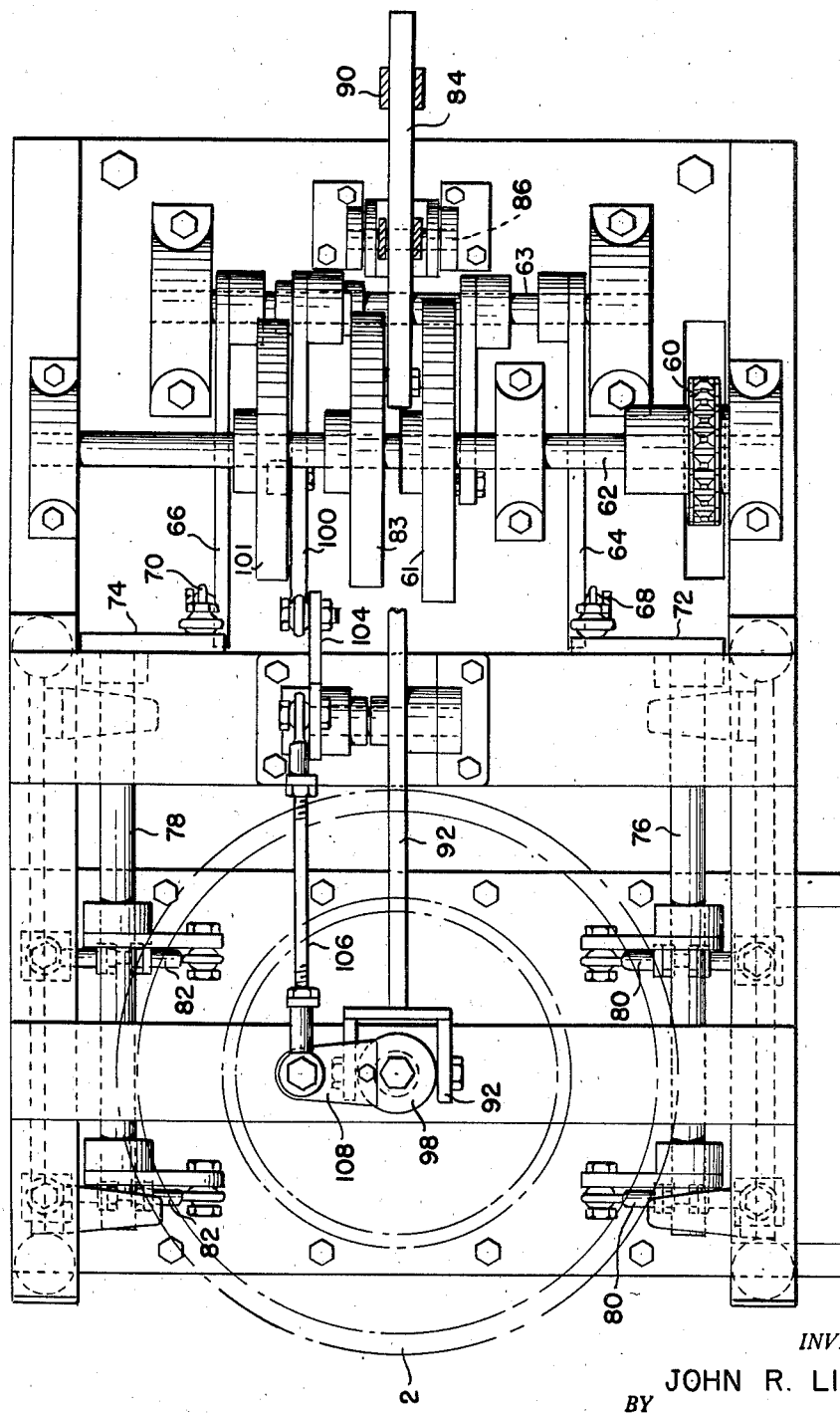
Figure 3 is a plan view of the machine.

The machine comprises a framework of structural elements suitable for support of the operating parts and has a form which will be apparent from the drawings without detailed description. Mounted in the frame is a hopper 2 into which icing may be poured from time to time, the hopper providing the supply of icing. The hopper delivers the icing into a generally cylindrical space 4 which is arranged to be closed at its lower end and opened at proper times by a pair of slides 6 and 8 which meet each other with provision of an opening embracing a vertical shaft 10. Below the plates 6 and 8 the shaft 10 supports a piston 12 which is provided with an annular wall 14 sliding in a fixed cylinder 18 and splined thereto at 16 so as to be restrained against rotary motion while free to slide vertically. A valve member 21 is positioned against the piston 12. As will be hereafter described, both the piston and the valve member are slotted and they are relatively movable. The shaft 10 is arranged to oscillate relatively to the piston through the pivot arrangement indicated at 11. The bottom of the cylinder 18 is arranged to be closed by a sliding plate 20 which moves transversally above a fixed plate 22 secured in position by wing-nuts 26. The plate 22 is replaceable by substitute plates and is provided with a series of openings 23 which are in alignment with and surrounded by cylindrical elements 24 desirably having serrated lower edges to provide for the proper feed and distribution of the icing on the cake. The openings just referred to are arranged to be aligned, during movements of the slide 20 with corresponding openings 25 in the slide which constitutes a valve for selectively providing or interrupting the flow of icing.

Abutment screws 28 supported by a bracket 29 from slide 8 are arranged to actuate the slide valve member 20 by engagement with crossbars 30 and 32 which may be adjustably secured to the valve member 20 so as to adjust the length of its strokes.

Figure 5:
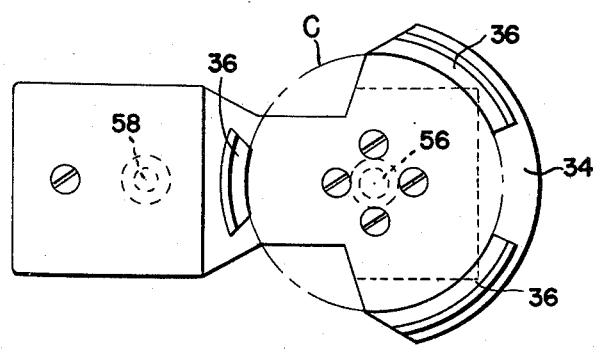
Figure 5 is a fragmentary plan view of the cake support, the view being from the plane indicated at 5—5 in Figure 2.

Below the hopper there is located the cake support 34 which is provided with guide elements 36 arranged to locate a cake in central position for icing. The elements 36 are segmental in form and are desirably downwardly tapered inwardly to facilitate placement of the cake in the position indicated in Figure 5 at C.

The machine is driven by means of a motor 38 which, through an adjustable cone pulley and belt arrangement 40 for speed adjustment, drives through the reduction gear box 42 an output shaft 43. This shaft carries a cam 44 arranged to rock a bell crank 46 which is journalled on a transverse shaft 47. Also journalled on this shaft is an arm 48 which is adapted to be pinned to the laterally extending arm of bell-crank 46 by a pin 50 mounted in a bracket 51 carried by the arm 48 and urged inwardly by a spring 53 to enter an opening in the bell-crank arm. The pin 50 has a semi-cylindrical washer 50' affixed thereto against which the spring acts. A link 55 is slotted at 57 to slide on a fixed pin and at 59 to slide on the pin 50. A cam 61 is formed on this link and is arranged when the link is pulled forwardly to act against the washer 50' and disengage the pin 50 from the bell-crank arm. This arrangement is provided to permit the operation of the other parts of the machine without effecting rise of the cake support, the driving arrangement for the cake support being disconnected by a pull forwardly on the link 55 and restored by pushing this link rearwardly. The arm 48 is connected by a link 52 to a crosshead 54 which is provided with a cylindrical extension 63 slidable in a fixed portion of the frame and prevented from rotating by a crosshead 65 slidable in a slot in a fixed vertical member 67. A screw 69 threaded into the member 63 and provided with a handle 71 for adjustment has an extension 56 which is connected into a thrust bearing 73 carried by the cake support. Adjustment of the screw 69 accordingly serves to adjust the cake support vertically with respect to the carrier 63 to provide for the suitable location of the support in icing cakes of various heights. A guide rod 58 slides in a bearing member in the crosshead 54. The foregoing elements provide for vertical oscillations of the cake support, a buffer spring 75 being provided to take up shock in its downward moment. The cam 44 is so contoured as to provide upper and lower rest periods of the support for the icing operation and for replacement of cakes thereon.

The shaft 43 drives through the sprocket and chain arrangement indicated at 60 an upper transverse shaft 62 from which the various motions of the machine are derived. Suitably contoured cam 61 on this shaft oscillates levers 64 and 66 fixed to a shaft 63 and which are respectively connected through links 68 and 70 to arms 72 and 74 carried by shafts 76 and 78 which through arms and links 80 and 82 serve to move the slides 6 and 8 in unison outwardly and inwardly. At the ends of the strokes of slides 6 and 8 the valve member 20 is also moved by engagement of pins 28 with the cross members 30 and 32, the movements of the valve member 20 being relatively slight and only sufficient to move the icing feed openings into and out of alignment.

Another cam on shaft 62 serves to oscillate a lever 84 mounted on a transverse shaft 86 and provided with the adjustable pivot 88 for a link 90, adjustment being provided by the adjustment of the pivot block by means of screw 89, the block being guided in an arcuate slot 91 in the lever. At its upper end the link 90 is connected to the lever 92 pivoted on a shaft 94 and forked at its forward end where it is provided with rollers 96 engageable within a groove in a spool member 98 secured to the shaft 10. By the arrangement just described vertical movements are imparted to the shaft 10.

Figure 7:
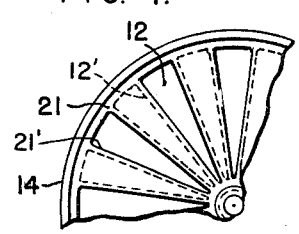
Figure 7 is a fragmentary plan view showing a portion of a piston with an associated valve.

Another lever 100 is driven by a cam on shaft 62 and serves through link 102 to operate a bell-crank 104 journalled on the shaft 94 and connected by link 106 to an arm 108 secured to the spool member 98. This last arrangement serves to provide oscillating movements through the shaft 10 to the valve member 21 which is secured to the lower end of this shaft. The valve member 21 oscillates with respect to the upper surface of the piston 12, the piston and valve member being provided with radial openings which may be caused to assume positions of alignment or misalignment to effect opening or closing of the communication between the spaces above and below the piston. A segmental showing of the arrangement of the piston and valve appears in Figure 7.

The operation of the machine is as follows:

A plate 22 is secured in position by wing nuts 26. Such plate will be provided with openings and feed members 24 in the desired configuration to provide the required ornamentation or distribution of icing. A corresponding slide 20 is provided having openings 25 corresponding to those in the plate 22. The feed of icing then takes place as follows during operation of the machine:

Assuming the shaft 10 in its uppermost position and with the valve member 21 in position closing off communication between the spaces above and below the piston, there will be icing both above and below the piston and in the supply hopper 2. Assuming that the down stroke of the shaft 10 is about to begin, the slides 6 and 8 will be in their outer position providing communication between the hopper and the space above the piston. At the same time the pins 28 will be in engagement with plates 32 with the slide valve 20 having its openings in alignment with those in the plate 22. The cake will be in its upper position with its top engaging or substantially in engagement with the feed members 24. As the piston moves downwardly it then forces the icing beneath it in the cylinder 18 through the aligned openings in valve member 20 and plate 22 and into the members 24 for application to the cake. By the adjustment of the pivot 88 the length of piston stroke may be controlled to secure the desired feed of icing through displacement of the piston.

After the piston reaches the lower end of its stroke, the members 6 and 8 are moved inwardly to closed position and in this action the pins 28 engage the plates 30 to move out of alignment the openings in the valve member 20 and plate 22.

Figure 4:
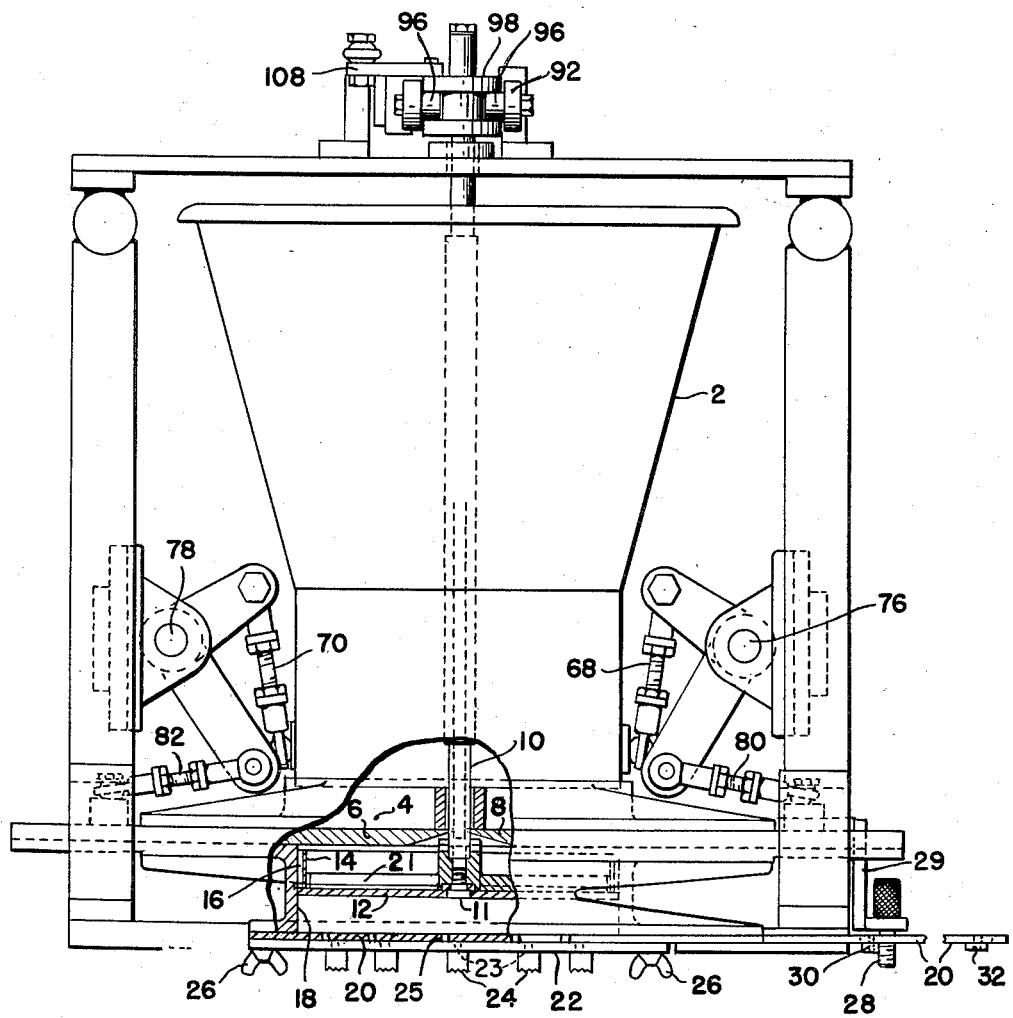
Figure 4 is a front elevation of the upper portion of the machine showing certain details in section.

Prior to the beginning of the stroke of shaft 10, the valve member 21 opens communication between the spaces above and below the piston. At this time there will be above the piston a new supply of icing drawn from the hopper during its down stroke. As the piston then moves upwardly, since the lower end of the cylinder is closed, icing flows through the piston openings uncovered by the valve member 21 so that as the piston rises the volume which it displaces beneath it is filled with icing. This is a forced action by reason of the fact that the plates 6 and 8 are in closed position. Thus, despite high viscosity of the icing, positive flow is assured, and, in fact, this is the case in all of the icing-moving operations involved. During the rise of the piston the cake support 34 is moved downwardly for removal of the iced cake and replacement by another. When the piston reaches the upper end of its stroke, the valve member 21 closes, the plates 6 and 8 are withdrawn to open communication between the hopper 2 and the upper portion of cylinder 18, and the valve member 20 is moved toward the right as viewed in Figure 4 to open the discharge ports, the cake in the meanwhile having been moved to its upper position for reception of the icing. The cycle then repeats as described above.

It will be evident from the foregoing that there is provided an automatic machine providing for positive feed of icing to cakes in patterns determined by the replaceable members 22 and 20. The quantity of icing which is fed in a single cycle is controlled by adjustment of pivot 88 and may vary from a quite small quantity to a quite large quantity which may, in effect, cover the entire cake if the members 24 are provided in considerable number and close together. The latter is desirable when a complete covering of the top of a cake is to be provided. While the icing as originally placed may be in the form of small dabs thereof, the operator with the stroke of a spatula may readily provide either even spreading or some desired uneven spreading such as may be required. It will, of course, be evident that the machine may be applied to the icing of the individual layers of a multiple layer cake. It will be also evident that the machine may be used for the feeding of other viscous materials, for example, batters for making cookies or the like or mixtures for the making of confectionery.

It will be evident that numerous variations may be made in details of construction and operation without departing from the invention as defined in the following claims.

What is claimed is:

1. An icing machine for cakes or other pastry comprising a support for the pastry, a distributing member having feed openings therein disposed above pastry carried by said support, a cylinder having its lower end associated with said openings, valve means controlling communication between said cylinder and said openings, a movable piston in said cylinder provided with openings, valve means controlling said piston openings, a supply hopper associated with the upper end of said cylinder, means controlling communication between said hopper and said cylinder, and means effecting cyclic operation of the aforementioned parts whereby during a downstroke of said piston its openings are closed, it draws icing from the hopper and forces icing through said feed openings, and whereby during an upstroke of said piston its openings are opened, communication between the hopper and upper portion of the cylinder is closed off, and said feed openings are closed off, thereby effecting transfer of icing from above the piston to below the same.

2. An icing machine according to claim 1 provided with adjustable means for operating said piston to vary the stroke thereof.

3. An icing machine according to claim 1 including means for moving said support between pastry-receiving and pastry-icing positions during the upstroke of said piston.

4. An icing machine for cakes or other pastry comprising a support for the pastry, a distributing member having feed openings therein disposed above pastry carried by said support, a cylinder having its lower end associated with said openings, valve means controlling communication between said cylinder and said openings, a movable piston in said cylinder, means controlling communication between the opposite sides of said piston, a supply hopper associated with the upper end of said cylinder, means controlling communication between said hopper and said cylinder, and means effecting cyclic operation of the aforementioned parts whereby during a downstroke of said piston communication between its opposite sides is closed, and it draws icing from the hopper and forces icing through said feed openings, and whereby during an upstroke of said piston communication between its opposite sides is opened, communication between the hopper and the upper portion of the cylinder is closed off, and said feed openings are closed off, thereby effecting transfer of icing from above the piston to below the same.

5. An icing machine according to claim 4 including means for moving said support between pastry receiving and pastry icing positions and means for interrupting the operation of said support moving means.

6. An icing machine for cakes or other pastry comprising a support for the pastry, a distributing plate having a plurality of spaced feed openings therein disposed above pastry carried by said support, a cylinder having its lower end associated with said plate, a valve plate positioned in sliding engagement with said distributing plate and provided with a plurality of spaced bores, means for moving said plates relative to each other to bring said bores into and out of alignment with said openings to control the passage of icing therethrough, a movable piston in said cylinder provided with a plurality of spaced openings, valve means controlling said piston openings, a supply hopper associated with the upper end of said cylinder, means controlling communication between said hopper and said cylinder, and means effecting cyclic operation of the aforementioned parts whereby during a downstroke of said piston its openings are closed, it draws icing from the hopper and forces icing through said feed openings, and whereby during an upstroke of said piston its openings are opened, communication between the hopper and upper portion of the cylinder is closed off, and said feed openings are closed off, thereby effecting transfer of icing from above the piston to below the same.

7. An icing machine for cakes or other pastry comprising a support for the pastry, a distributing member having feed openings therein disposed above pastry carried by said support, a cylinder having its lower end associated with said openings, valve means controlling communication between said cylinder and said openings, a movable piston in said cylinder provided with a plurality of radially extending openings, valve means including a plate positioned in sliding engagement with said piston and provided with a plurality of radially extending openings and means imparting rotary movement to said plate to bring said piston and plate openings into and out of engagement with each other to control flow of icing through said piston, a supply hopper associated with the upper end of said cylinder, means controlling communication between said hopper and said cylinder, and means effecting cyclic operation of the aforementioned parts whereby during a downstroke of said piston its openings are closed, it draws icing from the hopper and forces icing through said feed openings, and whereby during an upstroke of said piston its openings are opened, communication between the hopper and upper portion of the cylinder is closed off, and said feed openings are closed off, thereby effecting transfer of icing from above the piston to below the same.

References Cited in the file of this patent

UNITED STATES PATENTS

| Number | Name | Date |
| --- | --- | --- |
| 593,333 | Park | Nov. 9, 1897 |
| 1,036,108 | Harton | Aug. 20, 1912 |
| 1,799,755 | Loughridge | Apr. 7, 1931 |
| 2,393,096 | Fitzgerald | Jan. 15, 1946 |
| 2,520,242 | Grau | Aug. 29, 1950 |
| 2,534,504 | Engstrom | Dec. 19, 1950 |
| 2,549,851 | Pope | Apr. 24, 1951 |
| 2,669,947 | Ballew | Feb. 23, 1954 |
| 2,711,277 | Riza | June 21, 1955 |